E. P. NICHOLS.
MACHINE FOR EVENING AND GRADING SOLES.
APPLICATION FILED OCT. 21, 1911.

1,089,492.

Patented Mar. 10, 1914.
5 SHEETS—SHEET 2.

Fig. 2.

Witnesses:
H. C. Bower
Edward Maxwell

Inventor:
Almer P. Nichols,
by Geo. W. Maxwell,
Attorney.

E. P. NICHOLS.
MACHINE FOR EVENING AND GRADING SOLES.
APPLICATION FILED OCT. 31, 1911.

1,089,492.

Patented Mar. 10, 1914.
5 SHEETS—SHEET 5.

Fig. 5

Witnesses:
H. C. Bowser
Edward Maxwell

Inventor:
Elmer P. Nichols,
by Geo. S. Maxwell,
Attorney.

UNITED STATES PATENT OFFICE.

ELMER P. NICHOLS, OF MANCHESTER, NEW HAMPSHIRE, ASSIGNOR TO LACENE MANUFACTURING COMPANY, OF MANCHESTER, NEW HAMPSHIRE, A CORPORATION OF MAINE.

MACHINE FOR EVENING AND GRADING SOLES.

1,089,492.  Specification of Letters Patent.  Patented Mar. 10, 1914.

Original application filed August 6, 1904, Serial No. 219,755. Divided and this application filed October 31, 1911. Serial No. 657,748.

*To all whom it may concern:*

Be it known that I, ELMER P. NICHOLS, a citizen of the United States, and resident of Manchester, in the county of Hillsboro and State of New Hampshire, have invented an Improvement in Machines for Evening and Grading Soles, of which the following description, in connection with the accompanying drawings, is a specification, like letters on the drawings representing like parts.

This is a divisional case of my application Serial No. 219,755, filed August 6, 1904, now Patent No. 1,009,988, for a machine for evening and grade-marking boot and shoe soles, or other pieces of died stock having the same general characteristics. The present divisional case is restricted to mechanism for the grade marking of such died pieces of stock.
Said parent application is limited to the evening feature, and to those features which are not restricted to said marking feature alone, whereas the present divisional application is limited to the marking feature alone, i. e. each claim is intended to be restricted in some particular to means for visually indicating the thickness-measurement of the stock being graded. The term "grading means", as used in this application and in the parent or original application, means broadly either the evening means or the grade-marking means, and all the generic claims to the grading means, thus defined, are in the parent case, including all claims for combinations of the evening and the marking mechanisms, together with the group of claims to the evening mechanism alone, while the group of claims to the marking mechanism has been divided therefrom, by requirement of the Patent Office, and is contained in the present case.

In carrying out my invention, I provide a grade indicating or marking device, preferably consisting of a rotary marking wheel carried by a frame movable into and out of marking relation with the leather piece and provided with a pinion engaged and operated by a swinging rack which receives movement from connections with detecting means, including a plurality of independently movable feelers or posts, so mounted as to be moved separately or together as the particular stock may require by an actuator spring toward an opposite stock receiving and engaging member which coöperates with said detecting means in gripping the leather piece therebetween, whereby the unevennesses of the leather piece move one or both of the posts so as to set the said marking wheel controlled by the detecting means for indicating visually the thickness of the thinnest portion of the leather piece engaged by the detectors or feeler posts. In the preferred embodiment of the machine here presented, a plate is interposed between the ends of the posts and the leather piece, so that the posts engage the latter through the medium of said plate, which is so shaped with relation to the opposite gripping member which engages the opposite side of the leather piece as to receive readily block soles in that type of machine in which the work is fed through the machine by power.

My invention also includes, in combination with the gaging mechanism for setting a power operated marking mechanism in response to the detectors and feeler mechanism, connections from the gaging mechanism operating independently of the power mechanism for rotating the marking wheel.

Further features of my invention will appear more at length in the course of the following description, taken in connection with the accompanying drawings, in which—

Referring to the preferred embodiment of the invention as exemplified in the machine of the drawings, the mechanism thereof is shown as mounted in a usual or preferred frame 1 have uprights 2 at its front end, and said mechanism may be specifically described as consisting of a plate 3 whose bottom side constitutes the detecting face or surface to engage the sole, being slightly hollowed or cut away at 4 so as not to be affected by the middle portion of the leather sole being graded, and vertical detectors or posts 5, 6, which constitute feelers (as termed in my patents, including the original of this case and the application Serial No. 257,587, there mentioned as containing another species of this feeler mechanism,) shown as resting loosely at their lower ends in sockets 7 on the upper side of said plate, so as thus to engage indirectly the leather piece in opposition to a gripping member, preferably a roll for gripping against the opposite side of the leather piece, as will presently be described. Said application Serial No. 257,587 is now Patent No. 1,046,213. The detector posts are held downward by an equalizing cross-bar 8 resting on brackets or horizontal pins 9, 10 projecting from said posts. An actuating spring 11 engages at its lower end said bar 8 and at its upper end a block 12 adjusted by a thumb screw 13 threaded through a top bar 14 bolted at its ends to the opposite uprights 2.

Figure 1:
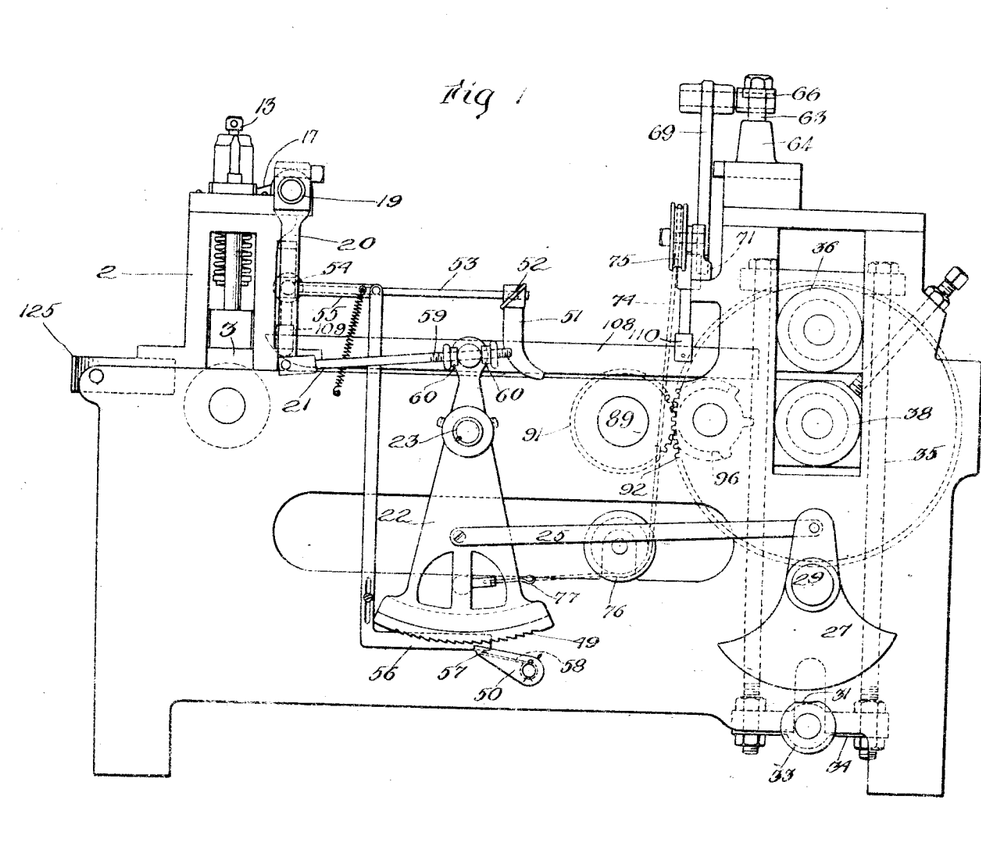
Figures 1 and 2 are respectively right and left side elevations of the machine, with various parts omitted for clearness of illustration.
Figure 2:
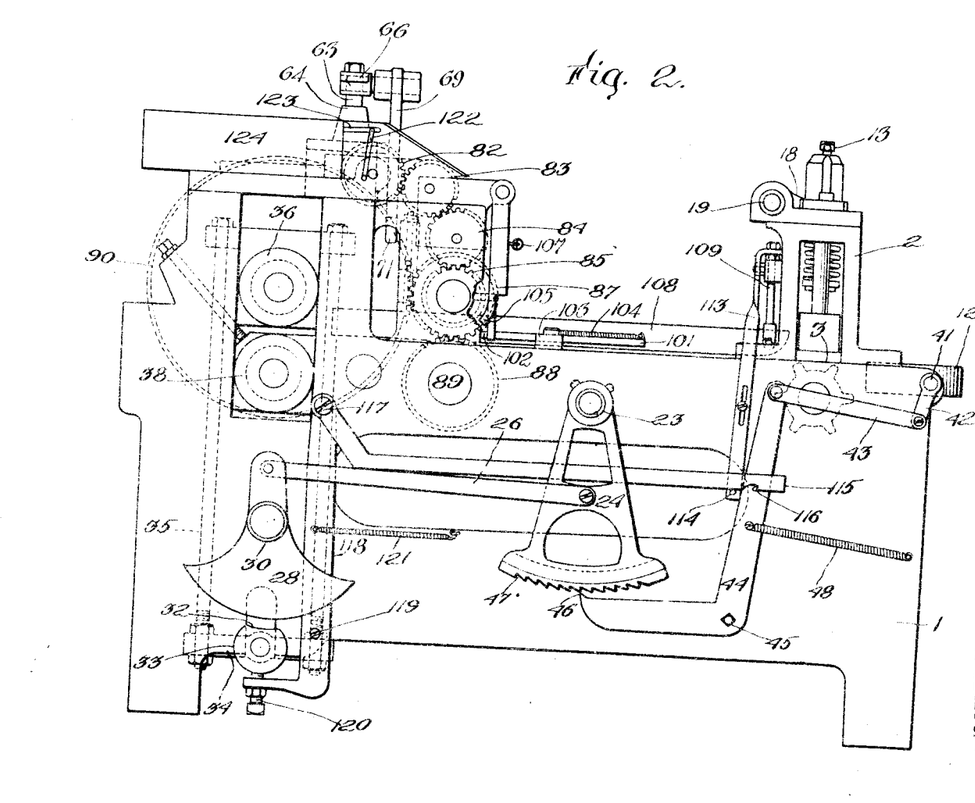
Figure 3:
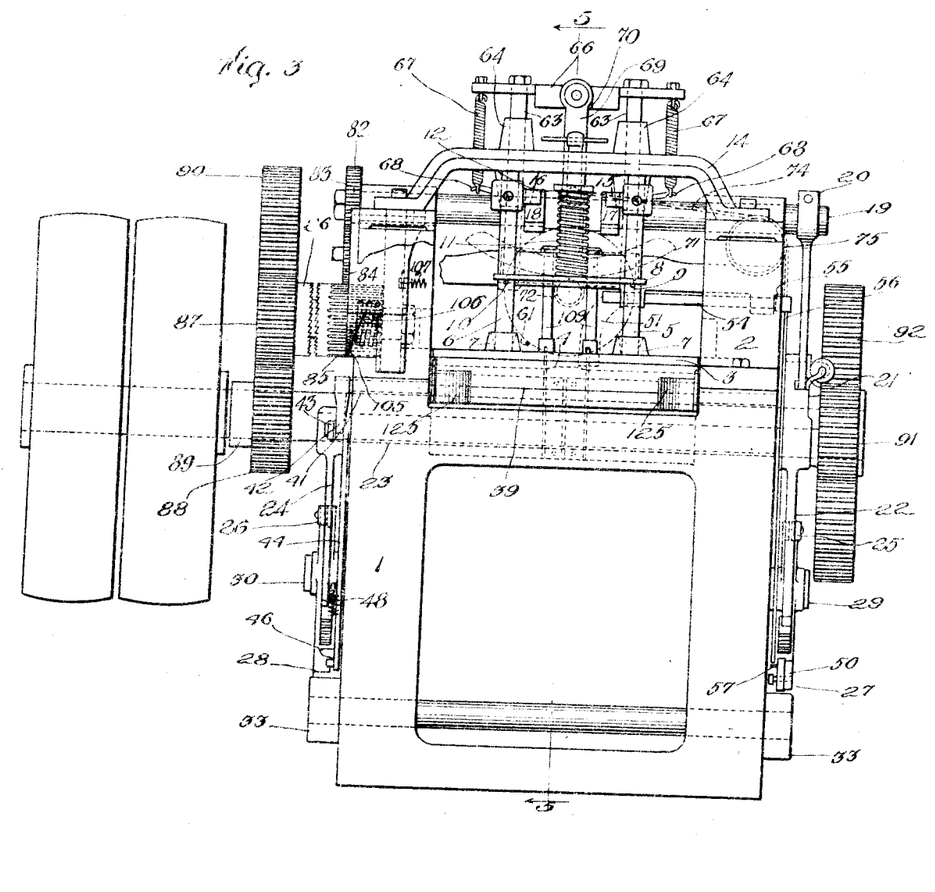
Fig. 3 is a front elevation thereof, partly broken away to illustrate parts at 90 the rear of the machine.

At their upper ends, the detector posts 5, 6 carry fixed lugs 15, 16 projecting toward each other, see Fig. 3, and loosely engaging the upper sides of arms or levers 17, 18 fast on a rock shaft 19 extending across the machine and carrying at its outer right-hand end a crank 20 connected by a link 21 to the upper end of a toothed sector 22 keyed to the projecting end of a shaft 23, see Fig. 1, passing through the machine. The shaft 23 has a somewhat similar toothed sector 24 keyed to its opposite end, see Fig. 2. The movement of these two toothed sectors or swinging levers 22, 24 is communicated by links 25, 26 to graduated or wedging cam stops 27, 28 pivoted at the opposite sides of the machine at 29, 30 respectively, to be engaged by the flattened upper surfaces 31, 32 of lugs 33 fast on the lower cross bars 34 of the journal frame 35 which carries at its upper end the adjusting roll or pressure device 36 which flattens out the stock against a spring-pressed under roll 38 while being marked by the grade designating marker. The toothed sectors 22, 24 are locked in their adjustment at the proper time by a pivoted gate 39, one of whose ends 40 is fast on a short rock shaft 41 carrying at its opposite end a crank 42, see Fig. 2, connected by a link 43 to an elbow lever 44 pivoted to the frame 1 at 45 and provided at its free end with a dog or detent 46, shown as having a small tooth held in engagement with the teeth 47 of the sector 24 by a spring 48.

The successively thinner measurements along the opposite edges of the sole or piece being graded are transmitted by the detectors, posts or feelers 5, 6 of the feeler mechanism to the gaging mechanism and are registered or retained by the teeth 49, Fig. 1, of the sector 22 engaged by a dog 50 on the right hand side of the machine, which constitutes said gaging mechanism, and this gaging mechanism is locked in its adjustment by the dog 46 at the opposite side of the machine, operated by the tripping of the gate 39 when permitted to fall by the complete feeding of the leather piece into the machine. The gaging mechanism is set to grade the stock for any given portion of its length, by means of a foot 51 adjustably secured at 52 in the path of the leather stock to an arm 53 fast on a rock shaft 54 from whose opposite end projects an arm 55 for raising and lowering an L-shaped bar 56. The free end of this bar 56 engages a pin 57 projecting from the end of the dog 50 which is held under constant tendency to rise by a spring 58. The result is that until the forward end of the piece of leather being graded meets the foot 51, the feeler mechanism can rise and fall and the sector 22 swing back and forth without registering any thickness-determinations, but the moment that the stock engages the foot 51, the bar 56 is thereby raised away from the dog 50 so that the latter is permitted to engage the teeth 49 of the sector 22. As said teeth are ratchet teeth, the sector is still free to swing to the left, Fig. 1, for successive increments of lowering movement of either or both of the detectors 5, 6 and adjacent parts of the feeler mechanism. To prevent the gaging mechanism from being influenced by the falling of the feeler mechanism when the leather escapes from beneath the plate 3, the locking mechanism 44—47 is provided to operate while the rear end of the stock is still beneath said plate. To permit the machine to mark the leather piece either flush or meager with reference to the actual grade of thickness determined by the feeler mechanism, the end 59 of the link 21 is threaded to receive nuts 60 by means of which the grade marking can be adjusted so as to be either flush or meager with respect to the gaging mechanism, said adjustment serving also to compensate for wear and to provide extreme certainty and precision of adjustment of the gaging mechanism. Further saving of leather and accuracy of grading is accomplished by making the teeth 49 finer than the degrees of grading for which the machine is constructed. For instance, in a machine grading to quarter-irons, (an iron being one forty-eighth of an inch) the teeth 47 of the locking sector 24 are spaced as required to set the grading devices to quarter-irons, but the teeth 49 of the gaging sector 22 are preferably only half as long, the result being that when the locking lever 44 acts, it finds the sectors 22, 24 already held by the dog 50 to within at least one-eighth of an iron of the nearest actual quarter-iron thickness of the leather. Hence, when the leather escapes from the feeler mechanism, that tooth 47 of the sector 24 must lock against the lever 44 which corresponds the nearest to the actual measurement of the leather. In other words, the gaging mechanism is set to the nearest quarter-iron, instead of always to the next quarter-iron, as in the machine of my Patent No. 844,809 of January 22, 1907.

Figure 4:
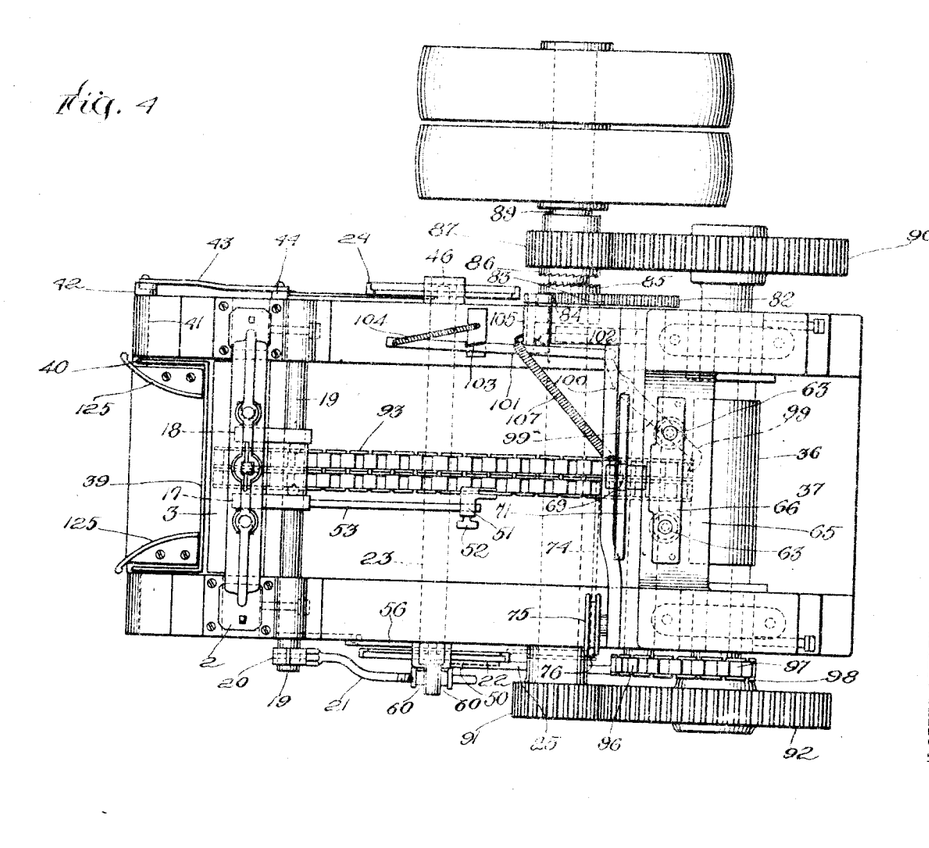
Fig. 4 is a top plan view thereof.
Figure 5:
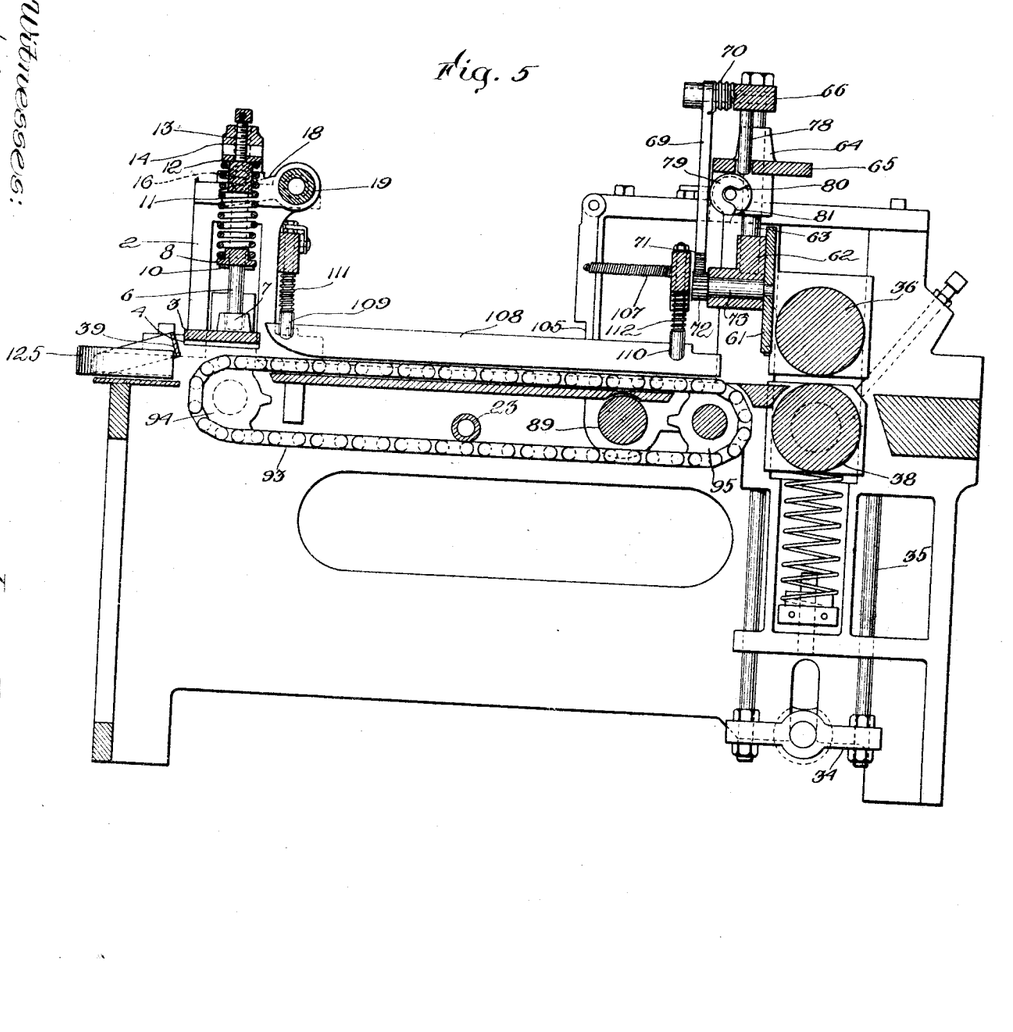
Fig. 5 is a central vertical longitudinal section thereof on the line 5—5, Fig. 3.

The grade marker, as already stated, is preferably in the form of a wheel, herein shown as a wheel 61 journaled in the lower end of a frame 62, Fig. 5, whose uprights 63 slide vertically in opposite guides 64 of a stationary cross plate 65. Said uprights are connected by a bridge 66 normally held under downward tendency by opposite springs 67, Fig. 3, engaging stationary hooks 68. Intermediate its ends, the bridge 66 supports a pivoted arm 69 held by a spring 70, Fig. 5, under tendency to swing toward the left, Fig. 3, said arm terminating at its lower end in a segmental rack 71 engaging a pinion 72 fast on a shaft 73 which carries the marking wheel 61. The arm 69 is moved to the right, Fig. 3, by a chain 74 passing over guide wheels 75, 76, Figs. 1 and 4, and secured to the sector 22 by an adjustable bolt 77 whose adjustment also serves as a means for bringing the marking mechanism into desired relation, flush or meager as preferred, with the gaging mechanism. The marking wheel 61 is reciprocated in unison with the passage of the stock, said mechanism being herein shown as set in operation by the stock itself, and comprising a plunger 78, Fig. 5, depending from the bridge 66 and normally engaged by a rotary lifter 79 journaled slightly to one side of the plunger so that the latter may descend, upon escaping from the end 80 thereof, and will be immediately engaged and lifted by the end 81 thereof. Said lifter is rotated by a gear 82, Fig. 2, driven by a train of gears 83, 84, 85, the latter forming a part of a clutch whose complemental portion 86, Figs. 3 and 4, is fast on a pinion 87 driven by a gear 88 on the main shaft 89. The pinion 87 meshes with a gear 90 which positively rotates the upper roll 36, and the main shaft 89 carries at its opposite end a pinion 91 meshing with a gear 92 which positively rotates the under roll 38. In this preferred machine of the drawings, the stock is not stationary but is fed through the machine by sprocket chains 93 passing over sprockets 94, 95, the latter being driven by sprocket wheels 96, 97, Fig. 4, and chain 98 from the right end of the lower roll 38. A lever 99 is pivoted at 100 and connects with a slide rod 101 provided on its outer edge with a projecting lug 102 and slightly farther to the left, Fig. 4, with an inclined surface to engage a cam block 103 against which said rod is normally held by a spring 104. The lug 102 is normally engaged by a pivoted plate 105 whose cam surface or oblique lower edge, Fig. 3, is adapted to be engaged by a pin 106 projecting from the ratchet gear or clutch 85 for moving said gear 85 to the right, Fig. 3, in opposition to a contained spring for impelling it normally into clutching engagement with the complemental part 86. Said pivoted plate is normally held rearward by a spring 107. Thus, as the stock strikes the lever 99, it thereby pushes the slide rod 101 to the left, Fig. 4, so that the projection 102 behind the cam plate 105 swings the latter forward away from the gear 85 sufficiently to disengage the pin 106 and permit the clutch to operate. At the same time the rod 101 is disengaged from the cam plate 105 by riding along the incline 103, whereupon the spring 107 restores the swinging plate to its original position to receive the pin 106 and disengage the clutch at the end of one revolution of said gear. Another embodiment or species of the stock-governed or tripped marker actuator is shown and specifically claimed in my copending application Serial No. 418,008, filed February 27, 1908, the generic claims being in the present case. Said application Serial No. 418,008, is now Patent No. 1,057,358.

The stock is held firmly down upon the sprocket chains by a pair of vertically arranged plates or pressers 108 supported at their opposite ends by rods 109, 110 and springs 111, 112, one of the rods 109 carrying a releasing bar 113, see Fig. 2, provided with a pin 114 at its lower end to lift a hook bar 115 from engagement with a pin 116 on the elbow lever 44 whenever stock is being fed into the machine. The opposite end of said bar 115 is connected at 117 to an elbow lever 118 pivoted at 119, its adjustable end 120 being normally held by a spring 121 against the adjacent lug 33 of the journal frame of the top feed roll or pressure device 36, so that as the work escapes from the machine and the roll 36 falls, its lug 33 swings lever 118 and pulls forward on bar 115, thereby opening the gate 39 through the releasing movement of lever 44, link 43, and crank 42. The pinion 82 carries a link 122 for operating the lever 123 of a usual counter or registering mechanism 124.

In operation, when the gate 39 flies up, the operator quickly enters the sole or other piece of died leather which is to be grade-marked, said piece being guided centrally by divergent wings 125 into the flaring mouth formed by the divergent surfaces of the receiving portion of the feeler mechanism, said receiving portion consisting of the plate 3 and coöperating feed roll beneath it which grip the leather firmly between them and thereby lift the detector posts or feelers 5, 6 (which rest on the feeler plate 3) in opposition to their actuating mechanism, normally tending to move said detectors downward into hard gripping and stock flattening relation with the leather. As soon as the stock engages with the sprocket chains 93, said chains immediately pull it into forcible engagement with said feeler mechanism. The detectors follow the inequalities of thickness of the sole or other leather piece along the edges thereof, free relative sliding movement being facilitated by the interposition of the plate 3. This plate receives the lateral or sliding movements of the stock and protects the feelers therefrom (thereby overcoming the necessity of having the feelers move laterally as in my Patent No. 841,809) and permits the requisite independent up-and-down movement of said feelers by its pivotal or rigid swinging body-movements at either end, as distinguished from the flexing or yielding of the corresponding plate in the other species thereof already mentioned as contained in my copending application Serial No. 257,587, filed April 27, 1905, now Patent No. 1,046,213. As one edge or the other of the sole proves to be thinner or thicker than the opposite edge, one detector or feeler-post or the other, as the case may be, moves accordingly under the pressure of the spring 11. As said post descends, (let it be supposed) its fixed lug 15 or 16, as the case may be, positively rocks shaft 19 by engaging the arm or lever 17, 18 thereof, and through said shaft the gaging sector 22 is swung to the left. Fig. 1. As soon as the front end of the leather piece has engaged the foot 51, it thereby instantly lifts the bar 56, whereupon pawl 50 engages the ratchet 49, and thereafter the mechanism is gaged to the thinnest edge portion of the stock passed over. As the forward end of the stock passes from beneath the feeler-posts and feeler plate, it engages and lifts the pressers 108 which thereupon release the hook bar 115 from the elbow lever 44, see Fig. 2, thereby leaving the gate 39 in free position to drop as soon as the rear end of the stock has escaped therefrom and passed beneath the feeler mechanism. When this takes place, the dog 16 immediately engages the teeth 17 of the sector 21, thereby positively locking the gaging mechanism. As said locking thereof takes place while the extreme rear end of the sole is still supporting the feeler plate and detectors, the subsequent dropping of said plate cannot in any way affect the adjustment of the gaging mechanism. Simultaneously with the movements of the feeler mechanism and sector 22, the marking device or wheel 61 has been correspondingly adjusted by the swinging of the rack 71 under the influence of chain 74 and spring 70, so that it also is located at the same time as the gaging mechanism and by the same means. As the stock is fed along beneath the pressers 108 and engages with lever 99, it thereupon throws the clutch automatically into driven engagement with the power mechanism, with the result that as the sole gets into just the right position beneath the marker 61, the plunger 78 is released, thereby permitting the springs 67 to cause the marking wheel 61 to stamp or brand forcibly the proper grade mark on the leather. This is done instantly, and immediately the lifter end 81 raises the marker. The same mechanism and movements which adjust and set the marking mechanism as just described, also adjust the wedging cam stops 27, 28, so that when the front end of the sole engages the rolls 36, 38, the upper roll 36 is lifted thereby until the lugs 33 engage that portion of the eccentric surfaces of said stops directly above said lugs. This flattens the stock or maintains it flat and at a predetermined level of the top surface thereof. The raising of the roll 36 by the entrance of the stock thereunder also permits the spring 121 of elbow lever 118 to move the hooked bar or latch 115 to the right, Fig. 2, into engagement with the pin 116 so that, upon the escape of the sole from the roll 36, the falling of the lugs 33 operates to pull said hooked bar 115 to the left, thereby unlocking the gaging mechanism and opening the gate 39 for permitting the operator to feed another blank into the machine.

As this divisional case is restricted to the marking or visual indicating species of sole grading, I omit a further explanation and discussion of the mechanism and advantages of my machine which are contained in the parent case of which this is a division. All the gaging adjustments are accomplished by the passage of the leather without depending for any of said adjustments upon the driving power of the machine, and hence there is no possibility of uncertainty or irregularity because of the slip or wear of the gears. All that the driving mechanism is required to do is to operate the feeding mechanism and restore the marking mechanism after it has operated.

My copending application Serial No. 325,224, filed July 9, 1906, contains a machine which, in a number of its features, is subordinate to generic claims of the present case, but claims a different species in a number of respects, as for instance the stock is held stationary in the machine during the feeding and grading thereof, and the detectors engage the stock with a gripping action during the detecting operation, and the marking die is selectively controlled by the detector or detectors nearest to the gripping device or plate which coöperates with the detectors to grip the stock in the sense of grasping the stock firmly so that it is held immovably during the detecting operation, and then the stock is backed or pulled out of the machine, as distinguished from its being in continuous movement and fed through the machine as in the present case by feeding mechanism.

I do not intend to restrict myself to the precise construction and arrangement of parts, although I have herein set forth the construction which I prefer and consider most practical, as I am aware that many changes in form, arrangement, and combination of parts may be resorted to without departing from the spirit and scope of my invention, as defined in the appended claims, taken in connection with the drawings and description.

Having described my invention, what I claim as new and desire to secure by Letters Patent is:

1. A machine of the kind described, having, in combination, means against which a piece of stock may be pressed, detecting means comprising a plurality of detectors independently movable in the direction of said first named means, an actuator and moving means therefor for causing one of said means to tend to approach the other, and means, controlled by the aforesaid detecting means and including a single common member actuated to visually indicate the thickness of the thinnest portion only of the stock as determined by said plurality of detectors.

2. A machine of the kind described, having, in combination, means against which a piece of stock may be pressed, a plurality of detectors movable to effect said pressure in the direction of said means for insuring relative pressing and stock-flattening movement between said detectors and means, means for so moving said detectors with said pressing and stock-flattening movement, and means controllably related to all the detectors but controlled by that detector which gets nearest to said first named means during the detecting operation, and including a single common member for visually indicating the distance between the two.

3. A machine of the kind described, having, in combination, devices for pressing a piece of stock on its opposite sides to be graded, including a plurality of detectors independently movable toward and from one side of the stock, means for maintaining said detectors under tendency to move toward the stock, and a single means controllably related to said plurality of detectors and controlled by at least one of said plurality of detectors for visually indicating the thickness of the stock at the thinnest place thus detected.

4. In a machine of the kind described, having power mechanism, a plurality of detectors responsive to the unevennesses of a leather piece to be graded, a grade-indicating device, and connecting mechanism controlled by at least one of said detectors for setting said grade-indicating device, operating mechanism adapted to be operated by said power mechanism for operating said indicating device with relation to the leather piece, said connecting mechanism containing means for setting the indicating device independently of said power mechanism.

5. In a machine of the kind described, having power mechanism, a plurality of detectors movable in accordance with the unevennesses of a leather piece to be graded, a grade-indicating device, and connecting mechanism controlled by at least one of said detectors for setting said grade-indicating device, the latter including a movable frame adapted to be operated by said power mechanism for operating said indicating device with relation to the leather piece, said connecting mechanism containing means for setting the indicating device independently of said power mechanism.

6. In a machine of the kind described, stock grading mechanism, including visual grade-indicating mechanism, feeler mechanism, including selective means for detecting the thinnest spot among a plurality of spots felt of in a predetermined area of the stock, and mechanism for transmitting said single detection only of said thinnest spot of said feeler mechanism to the visual grade-indicating mechanism, said transmitting mechanism including adjusting means for regulating said indicating mechanism to indicate in accordance with a desired variation in thickness-designation from the said thinnest detection of said feeler mechanism.

7. In a machine of the kind described, feeler mechanism, grade marking mechanism, and gaging mechanism operated by said feeler mechanism for setting said marking mechanism, the latter including a vertically movable frame carrying a marking wheel, power mechanism for operating said frame, a lifter operated by the power mechanism of the machine for lifting said frame and wheel when it has fallen, and connections from said gaging mechanism operating independently of said power mechanism for rotating said marking wheel.

8. In a machine of the kind described, feeler mechanism, grade marking mechanism, and gaging mechanism operated by said feeler mechanism for setting said marking mechanism, the latter comprising a vertically movable frame carrying a marking wheel, provided with a pinion, an arm pivoted on said frame and provided with a segmental rack to engage said pinion, a spring normally moving said arm in one direction, and a connection from said gaging mechanism for moving said arm in an opposite direction.

9. In a machine of the kind described, feeler mechanism, grade marking mechanism, means for adjusting the latter in accordance with the determinations of the former, power mechanism, means for operating said marking mechanism, a clutch for operating said means by said power mechanism, and a trip in position to be engaged by the stock when the latter is in place to be marked for automatically actuating said clutch at the moment the stock is beneath said marking mechanism.

10. In a machine of the kind described, feeler mechanism to detect the grade of a piece of stock, stock grading mechanism including grade marking mechanism, gaging mechanism responsive to the former to set the latter, connecting means between the feeler mechanism and gaging mechanism, and means actuated by the stock itself to operate the marking mechanism to mark the stock.

11. In a machine of the kind described, detecting means to determine the thin spots in a leather piece, a marking device to grade-mark said piece, a frame supporting said device movable for marking the work, including a transverse bridge, springs secured at one end to a relatively stationary part of the machine and at the other end to said bridge for moving said frame and marking device to mark the work, means for transmitting to said marking device the determinations of said detecting means, means for obstructing the said movement of the marking device, and means for removing said obstructing means to allow the marking movement of the marking device.

12. In a machine of the kind described, detecting means to determine the thin spots in a leather piece, a marking device to grade-mark said piece, a movable frame supporting said device, including a transverse bridge, springs secured at one end to a relatively stationary part of the machine and at the other end to said bridge for moving said frame and marking device to mark the work, means for transmitting to said marking device the determinations of said detecting means, means for obstructing the said movement of the marking device, and means actuated by the stock in passing or removing said obstructing means to allow the marking movement of said marking device.

13. In a machine of the kind described, detecting means to determine the thin spots in a leather piece, a marking device to grade-mark said piece, a movable frame supporting said device, including a transverse bridge, swinging means for shifting said marking device with relation to said frame to vary the grade marks, connections for transmitting to said swinging means the determinations of said detecting means, means for obstructing the said movement of the marking device, and means for removing said obstructing means to allow the operation of the marking device.

14. In a machine of the kind described, detecting means to determine the thin spots in a leather piece, a marking device to grade-mark said piece, a frame supporting said device, including a transverse bridge, swinging means movable with said bridge for shifting said marking device with relation to said frame to vary the grade marks, connections for transmitting to said swinging means the determinations of said detecting means, means for obstructing the said movement of the marking device, and means for removing said obstructing means to allow the operation of the marking device.

15. In a machine of the kind described, detecting means to determine the thin spots in a leather piece, a marking wheel to grade-mark said piece, power mechanism for moving said wheel to mark the work, a pinion movable with said wheel for rotating the latter, a rack for actuating said pinion, and connections between said rack and detecting means and operable independently of said power mechanism for transmitting the determinations of the latter to said wheel.

16. In a machine of the kind described, detecting means to determine the thin spots in a leather piece, a marking wheel to grade-mark said piece, power mechanism for moving said wheel to mark the work, a pinion movable with said wheel for rotating the latter, a swinging rack for actuating said pinion, connections between said rack and detecting means and operable independently of said power mechanism for transmitting the determinations of the latter to said wheel, and a spring always tending to move said rack in a given direction.

17. In a machine of the kind described, detecting means to detect and select a thin spot from among thicker spots in a leather piece, a marking wheel to grade-mark said piece, movable bodily in the machine toward and from the work, a pinion having a body movement with said wheel and a rotary movement for rotating the latter, a swinging rack for actuating said pinion, and connections between said rack and detecting means for transmitting the determinations of the latter to said wheel, including adjusting means for accurately adjusting the position of said rack with relation to the detecting means.

18. A machine of the class described, having, in combination, means against which a piece of stock may be pressed, detecting means comprising a plurality of detectors independently movable toward and from said first mentioned means, an actuator and moving means therefor for causing one of said means to tend to move toward the other, and means controllably related to all the detectors but selectively controlled by the one which gets nearest said first named means during the detecting operation and including a single common member actuated to indicate the thickness of the stock engaged by such one of the detectors.

19. A machine of the class described, having, in combination, means against which a piece of stock may be pressed, a plurality of detectors movable in the direction of said means either collectively or independently, means for producing relative movement between said detectors and said first named means, and means controllably related to all the detectors but selectively controlled by the one which gets nearest said first named means during the detecting operation and including a single common member actuated to indicate the thickness of the stock engaged by said one of the detectors.

20. In a machine of the kind described, power operating mechanism, detecting means to determine the thin spots in a leather piece, a grade-marking device movable toward and from said piece for grade-marking the latter, mechanism responsive to said detecting mechanism for adjusting said grade-marker, and operating mechanism for said marker including a rotary lifter arranged to have intermittent lifting connection with said marker, gearing, including a clutch, from said power mechanism to said lifter for operating the latter at predetermined intervals, and automatic clutch-operating mechanism for operating the clutch in timed relation to the adjusting of the marker.

21. In a machine of the kind described, power operating mechanism, detecting means to determine the thin spots in a leather piece, a grade-marking device movable toward and from said piece for grade-marking the latter, mechanism responsive to said detecting mechanism for adjusting said grade-marker, and operating mechanism for said marker including a clutch for coupling said operating mechanism with said power mechanism, and automatic clutch-operating mechanism for operating the clutch in timed relation to the adjusting of the marker.

22. In a machine of the kind described, power operating mechanism, detecting means to determine the thin spots in a leather piece, a grade-marking device movable toward and from said piece for grade-marking the latter, mechanism responsive to said detecting mechanism for adjusting said grade-marker, and operating mechanism for said marker including a clutch for coupling said operating mechanism with said power mechanism, and automatic clutch-operating mechanism for operating the clutch in timed relation to the adjusting of the marker, said clutch-operating mechanism including a spring for moving the clutch into operative position, a cam device movable toward and from the clutch, means connected with the clutch for engaging said cam device and thereby retracting the clutch against the force of said spring, and means actuated automatically in timed relation to said adjusting of the marker for moving said cam device to release the clutch and thereby permit the power mechanism to actuate the marker.

23. In a machine of the kind described, power operating mechanism, detecting means to determine the thin spots in a leather piece, a grade-marking device movable toward and from said piece for grade-marking the latter, mechanism responsive to said detecting mechanism for adjusting said grade-marker, and operating mechanism for said marker including a clutch for coupling said operating mechanism with said power mechanism, and automatic clutch-operating mechanism for operating the clutch in timed relation to the adjusting of the marker, said clutch-operating mechanism including a swinging cam plate having a beveled engaging surface, means connected with the clutch for engaging said beveled surface to retract the clutch against the force of said spring, and means actuated automatically in timed relation to said adjusting of the marker for swinging said plate to release the clutch and thereby permit the power mechanism to actuate the marker.

24. In a machine of the kind described, power operating mechanism, detecting means to determine the thin spots in a leather piece, a grade-marking device movable toward and from said piece for grade-marking the latter, mechanism responsive to said detecting mechanism for adjusting said grade-marker, and operating mechanism for said marker including a clutch for coupling said operating mechanism with said power mechanism, and mechanism having an actuating part in the path of the stock being graded for timing the operation of the clutch.

25. In a machine of the kind described, power operating mechanism, detecting means to determine the thin spots in a leather piece, a grade-marking device movable toward and from said piece for grade-marking the latter, mechanism responsive to said detecting mechanism for adjusting said grade-marker, and operating mechanism for said marker including a clutch for coupling said operating mechanism with said power mechanism, and automatic clutch-operating mechanism for operating the clutch in timed relation to the adjusting of the marker, said clutch-operating mechanism including a swinging cam plate having a beveled engaging surface, means connected with the clutch for engaging said beveled surface to retract the clutch against the force of said spring, and mechanism having an actuating part in the path of the stock being graded for swinging said cam plate into clutch-releasing position.

In testimony whereof, I have signed my name to this specification, in the presence of two subscribing witnesses.

ELMER P. NICHOLS.

Witnesses:
   Geo. H. Maxwell,
   C. L. Rogers.

ing surface, means connected with the clutch for engaging said beveled surface to retract the clutch against the force of said spring, and mechanism having an actuating part in the path of the stock being graded for swinging said cam plate into clutch-releasing position.

In testimony whereof, I have signed my name to this specification, in the presence of two subscribing witnesses.

ELMER P. NICHOLS.

Witnesses:
GEO. H. MAXWELL.
C. L. ROGERS.

---

Correction in Letters Patent No. 1,089,492.

It is hereby certified that in Letters Patent No. 1,089,492, granted March 10, 1914, upon the application of Elmer P. Nichols, of Manchester, New Hampshire, for an improvement in "Machines for Evening and Grading Soles", an error appears in the printed specification requiring correction as follows: Page 6, line 49, for the word "or" read *for*; and that the said Letters Patent should be read with this correction therein that the same may conform to the record of the case in the Patent Office.

Signed and sealed this 31st day of March, A. D., 1914.

[SEAL.]

J. T. NEWTON,
*Acting Commissioner of Patents.*

Correction in Letters Patent No. 1,089,492.

It is hereby certified that in Letters Patent No. 1,089,492, granted March 10, 1914, upon the application of Elmer P. Nichols, of Manchester, New Hampshire, for an improvement in "Machines for Evening and Grading Soles", an error appears in the printed specification requiring correction as follows: Page 6, line 49, for the word "or" read *for*; and that the said Letters Patent should be read with this correction therein that the same may conform to the record of the case in the Patent Office.

Signed and sealed this 31st day of March, A. D., 1914.

[SEAL.]

J. T. NEWTON,

*Acting Commissioner of Patents.*